United States Patent [19]
Hajdukiewicz

[11] Patent Number: 5,971,903
[45] Date of Patent: Oct. 26, 1999

[54] METHOD AND APPARATUS FOR CHANGING OPERATING MODULES ON A COORDINATE POSITIONING MACHINE

[75] Inventor: Peter Hajdukiewicz, Sapperton, United Kingdom

[73] Assignee: Renishaw PLC, Gloucestershire, United Kingdom

[21] Appl. No.: 09/010,794

[22] Filed: Jan. 22, 1998

[30] Foreign Application Priority Data

Jan. 25, 1997 [GB] United Kingdom .................... 9701571

[51] Int. Cl.⁶ ...................................................... B23Q 3/155
[52] U.S. Cl. ................................. 483/1; 483/59; 483/901
[58] Field of Search ................................. 483/54, 55, 58, 483/59, 29, 901, 902; 901/41

[56] References Cited

U.S. PATENT DOCUMENTS

| | | |
|---|---|---|
| 3,726,001 | 4/1973 | Anderson et al. . |
| 4,338,709 | 7/1982 | Straub et al. ......................... 483/59 X |
| 4,349,946 | 9/1982 | McMurtry . |
| 4,637,119 | 1/1987 | Schneider et al. .................... 483/69 X |
| 4,674,172 | 6/1987 | Botimer ................................ 483/59 X |
| 4,922,603 | 5/1990 | Kosmonski ........................... 483/59 X |
| 5,028,901 | 7/1991 | Enderle et al. ...................... 483/569 X |
| 5,044,063 | 9/1991 | Voellmer ................................... 483/59 |
| 5,372,567 | 12/1994 | Whittington et al. .................... 483/29 |
| 5,404,649 | 4/1995 | Hajdukiewicz et al. .................. 33/503 |
| 5,807,221 | 9/1998 | Yi ............................................. 483/59 |

FOREIGN PATENT DOCUMENTS

| | | |
|---|---|---|
| 0-028-329-A2 | 5/1981 | European Pat. Off. . |
| 213399 | 3/1987 | European Pat. Off. ................. 483/59 |
| B-293 036 | 11/1988 | European Pat. Off. . |
| 0-334-563-A2 | 9/1989 | European Pat. Off. . |
| B-523 906 | 1/1993 | European Pat. Off. . |
| B-566 719 | 10/1993 | European Pat. Off. . |
| 145201 | 11/1980 | Germany ................................ 483/59 |
| 276976 | 3/1990 | Germany ................................ 483/59 |
| 0044547 | 3/1986 | Japan ..................................... 483/59 |
| 1433754 | 10/1988 | U.S.S.R. ................................. 483/59 |
| 2-167 559 | 11/1985 | United Kingdom . |
| 2-176-136-A | 12/1986 | United Kingdom . |
| WO 89/05210 | 6/1989 | WIPO . |

OTHER PUBLICATIONS

Renishaw Electrical Limited (Sales Brochure), "Autochange: Flexible Probing System for Co–ordinate Measuring Machines", Issue 1, Aug. 1984.

*Primary Examiner*—William Briggs
*Attorney, Agent, or Firm*—Oliff & Berridge, PLC

[57] ABSTRACT

A system is disclosed enabling the automated exchange of touch probes (34,38) on an articulating probe head 40. The touch probes are mounted to adaptors 32, and are housed in storage ports 20 of a magazine. An adaptor 32 is repeatably located upon the retaining module by the mutual engagement of kinematic support elements 50,52 on the probe head 40 and adaptor 32 respectively. The support elements 50,52 are urged into mutual engagement by a locking mechanism having a spigot 60 on the probe head 40 which engages a cam 62 on the adaptor 32; rotation of the cam 62 locks/unlocks the support elements into mutual engagement. During an exchange operation the cam 62 is rotated by a screwdriver 80 in the storage port. Rotation of the screwdriver 80 is caused by relative movement of the storage port and the support plate 14, which is part of the support structure of the magazine. This relative movement is powered by the motion of the arm of the machine (to which the probe head 40 is mounted) along a path B,C,D,E, during an exchange operation.

18 Claims, 12 Drawing Sheets

METHOD AND APPARATUS FOR CHANGING OPERATING MODULES ON A COORDINATE POSITIONING MACHINE

BACKGROUND TO THE INVENTION

1. Field of the Invention

The present invention relates to the exchange of operating modules on coordinate positioning machines, such as machine tools or coordinate measuring machines. Such machines comprise an arm and a table, movable relative to each other, typically with three linear degrees of freedom. In use, an operating module, such as a cutting tool or a touch probe, for example, may be mounted to the arm of the machine to enable the machine to perform a cutting or measuring operation upon a workpiece which is supported on the table.

During operation of such a machine, it is frequently desirable to exchange one operating module for another. For example, in the case of a machine tool, after performing a cutting operation upon a workpiece, it may be desirable to exchange the cutting tool for a touch trigger probe, which will allow the machine to inspect the relative position and/or dimensions of the surfaces of the workpiece recently machined. In the case of a coordinate measuring machine, it may be desirable to exchange a touch trigger probe for an analogue probe, or a temperature sensing probe, for example. Alternatively, it may be desirable to exchange one stylus on a particular touch trigger or analogue probe, for another.

2. Description of Related Art

Systems providing the automatic exchange of operating modules on coordinate measuring machines are known for example from EP 293036, U.S. Pat. No. 4,637,119, EP 566719, U.S. Pat. No. 4,349,946 and WO89/05210. The prior art references disclose systems for exchanging operating modules in which the coupling and decoupling of an operating module to a retaining module supported on the arm of the machine is performed in a number of ways.

SUMMARY OF THE INVENTION

A first aspect of the present invention provides a system providing exchange of operating modules on a coordinate positioning machine including a magazine and a retaining module, each of which are located on relatively movable parts of the machine;

the magazine having a plurality of storage ports, at least one of which houses an operating module; both the operating and retaining modules having support elements which are mutually engageable to locate the operating module repeatably on the retaining module;

the system also having a releasable locking mechanism including co-operable sub-mechanisms on the operating and retaining modules which act to hold the support elements in mutual engagement, locking and unlocking of the locking mechanism being performed by a locking movement of at least a part of one of the sub-mechanisms between two positions;

wherein during an exchange operation, locking/unlocking movements are actuatable by movement of the storage port and/or the retaining module relative to a part of the machine on which the magazine is located, while the retaining module is docked with the storage port to perform an exchange operation.

In one embodiment of the present invention an actuating member is situated on the storage port, and the actuating member is engageable with one of the sub-mechanisms to actuate the locking movement between two positions. Relative movement of the storage port and a support structure of the magazine upon which the storage port is mounted powers motion of the actuating member to achieve such actuation.

In an alternative embodiment an actuating member on the retaining module interacts with a feature on the support structure during their relative movement to power the locking movement between the two positions.

The sub-mechanisms of the locking mechanism may be single components, or may equally be more complex in nature and actuatable by motion of one or more parts thereof.

In a preferred embodiment both locking and unlocking of the operating and retaining modules takes place as a result of the movement of the storage port and/or retaining module relative to the machine. Alternatively the mechanism may be of the type where e.g. locking is actuated by the movement of the storage port and/or retaining module relative to the base structure, and e.g. unlocking occurs under the action of e.g. a spring bias (any relative movement of storage port/ retaining module and base structure occurring during the unlocking being incidental, since it is not actuating the unlocking operation).

The nature of the operating module will be determined by the type of machine on which the system is employed and may, for example, be any one of a touch probe or a stylus for such a probe, a non-contact inspection probe, an environmental sensor, a welding arm, or a cutting tool.

BRIEF DESCRIPTION OF DRAWINGS

An embodiment of the invention will now be described, by way of example, and with reference to the accompanying drawings in which.

DESCRIPTION OF PREFERRED EMBODIMENTS

Figure 1:
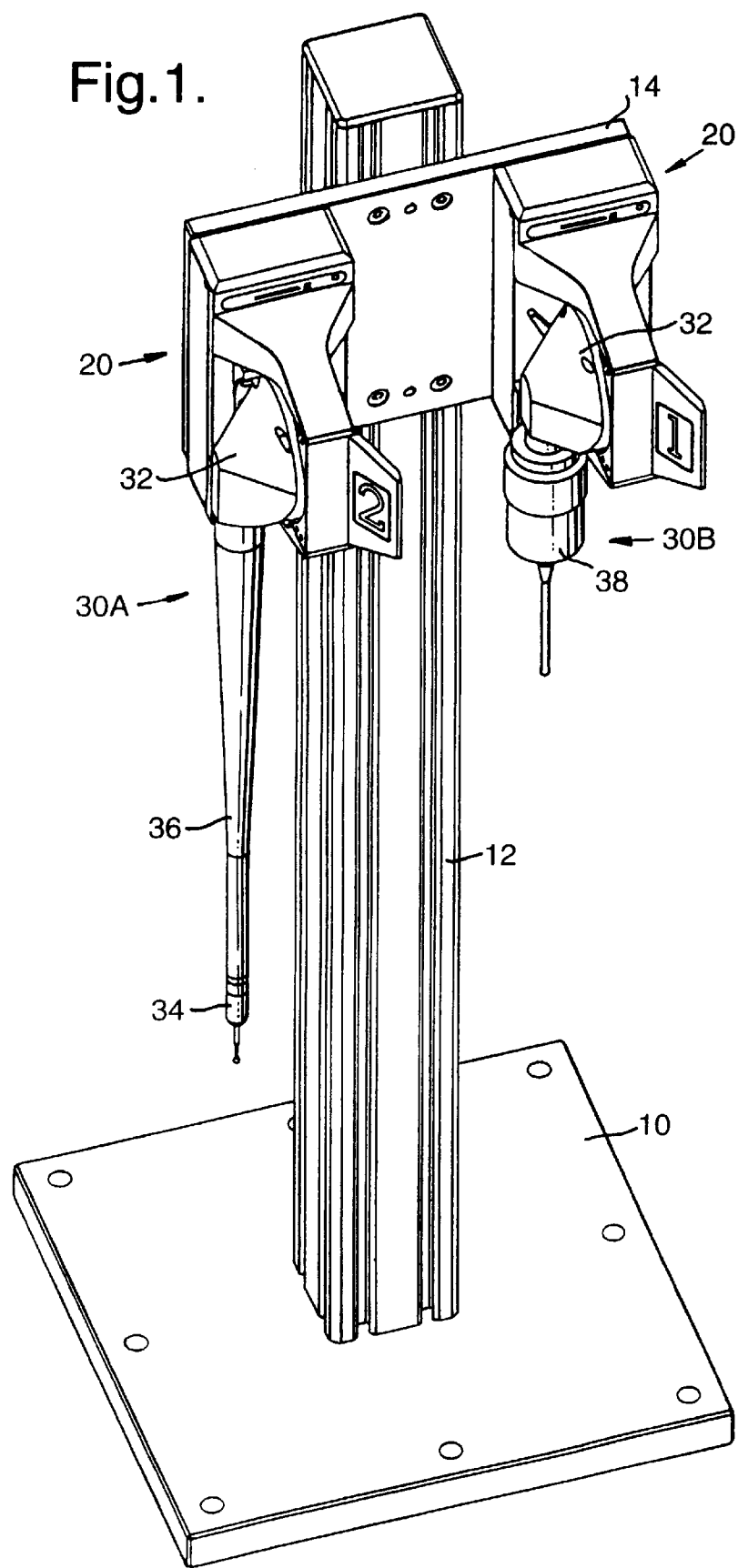
FIG. 1 is a perspective view of a storage magazine in accordance with the present invention.

Referring now to FIG. 1, a magazine, retained within the working area of a coordinate measuring machine, includes a base structure provided by a square mounting plate 10 supporting an extruded pillar 12, and upon which a support plate 14 is mounted in a vertically adjustable position. A pair of storage ports 20 are mounted to the base structure at the support plate 14. Each of the storage ports retains an operating module 30. In the present example, the operating module 30A includes a mounting adaptor 32, upon which a touch trigger probe 34 is supported via an extension bar 36; the operating module 30B includes a mounting adaptor 32 to which an analogue probe 38 is connected.

Figure 2:
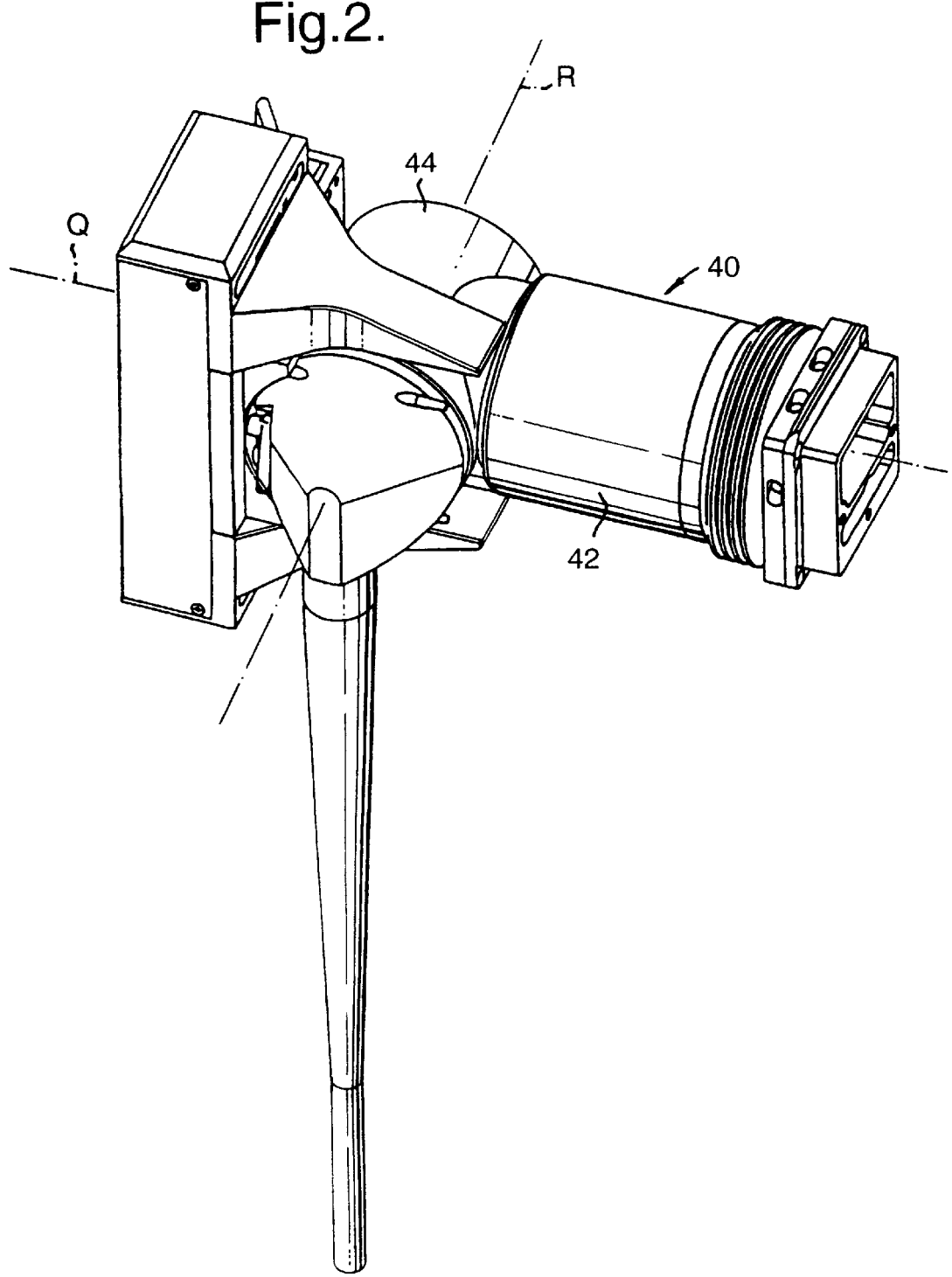
FIG. 2 is a perspective view of an exchange operation.

Referring now to FIG. 2, each of the operating modules 30 is retained in a storage port 20 to enable a retaining module 40, supported on the arm of the coordinate measuring machine, to exchange one operating module for another. In this example, the retaining module 40 is a two-axis articulating probe head, having serially mounted rotary axis members 42,44, which provide orientation about rotary axes Q and R respectively.

Figure 3:
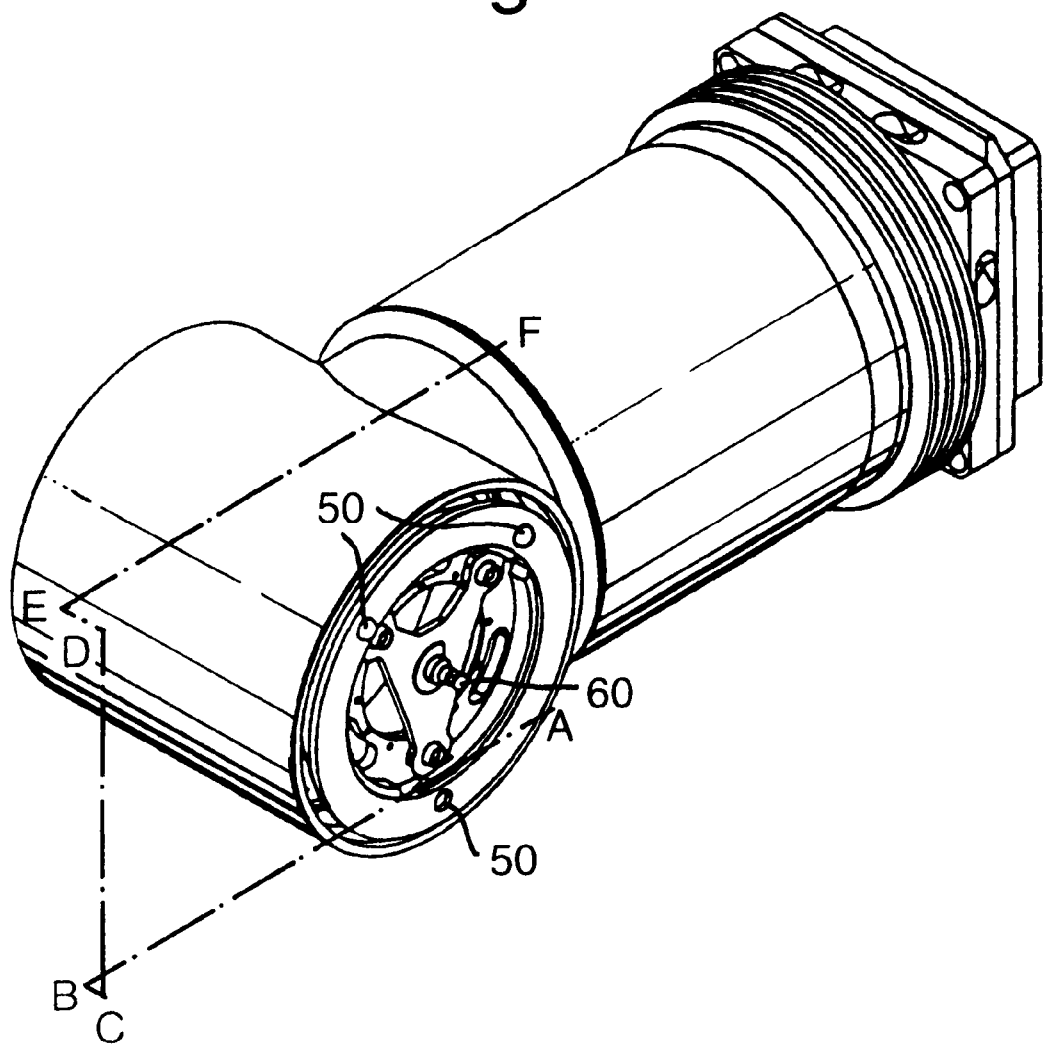
FIG. 3 is a perspective view of a part of a retaining module during the exchange operation of FIG. 2.
Figure 4A:
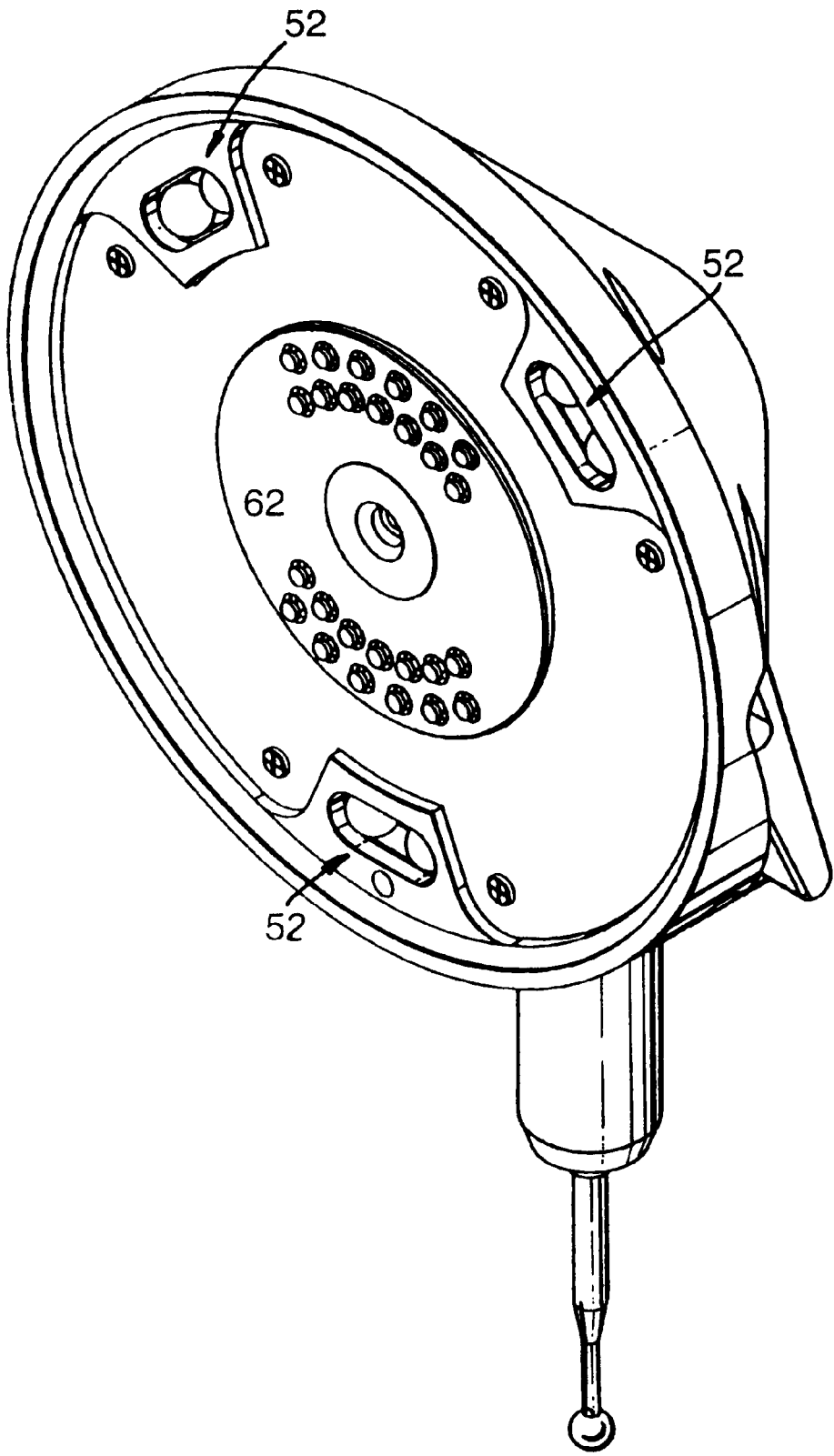
FIGS. 4a and 4b are perspective views of an operating module.
Figure 4B:
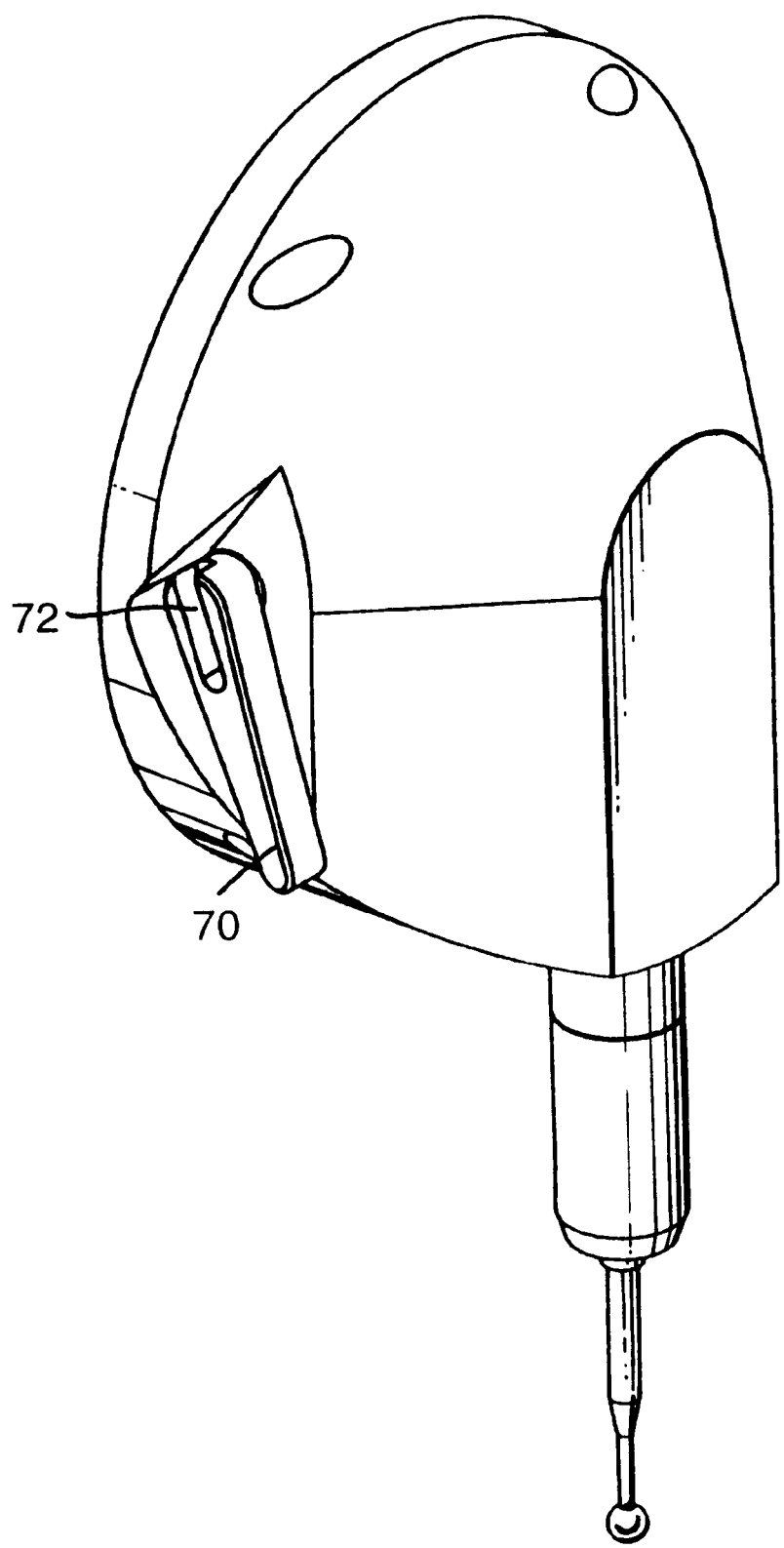

Referring now to FIGS. 3 and 4, an operating module 30 is repeatably located upon the retaining module 40 by the engagement of support elements, in the form of three balls 50 on the retaining module, with further support elements in the form of pairs of mutually convergent surfaces provided by three correspondingly positioned pairs of balls 52, and located on the adaptor 32 of the operating module 30. Each operating module 30 is thus kinematically located upon the retaining module 40. Releasable retention of an operating module 30 upon the retaining module 40 is effected by a locking and unlocking mechanism having two sub-mechanisms: one on the retaining module and having the form of a ball-ended spigot 60; and one on the adaptor 32 having the form of a cam 62. Engagement of the ball-ended spigot 60 on the retaining module in the central slot of the rotatable cam 62 on the adaptor 32 of the operating module 30, and subsequent rotation of the cam 62 has the effect of applying a pulling force to the spigot 60, causing the balls 50,52 to come into engagement, thereby locking the operating module 30 to the retaining module 40. Alternatively, rotation of cam 62 in the reverse sense has the effect of releasing the aforementioned pulling force, and thereby unlocking the operating and retaining modules 30,40. Rotatable cam 62 is connected to a lever 70, and it is by rotation of this lever 70, either manually or automatically, that coupling and decoupling of the operating and retaining modules 30,40 occurs.

Figure 5:
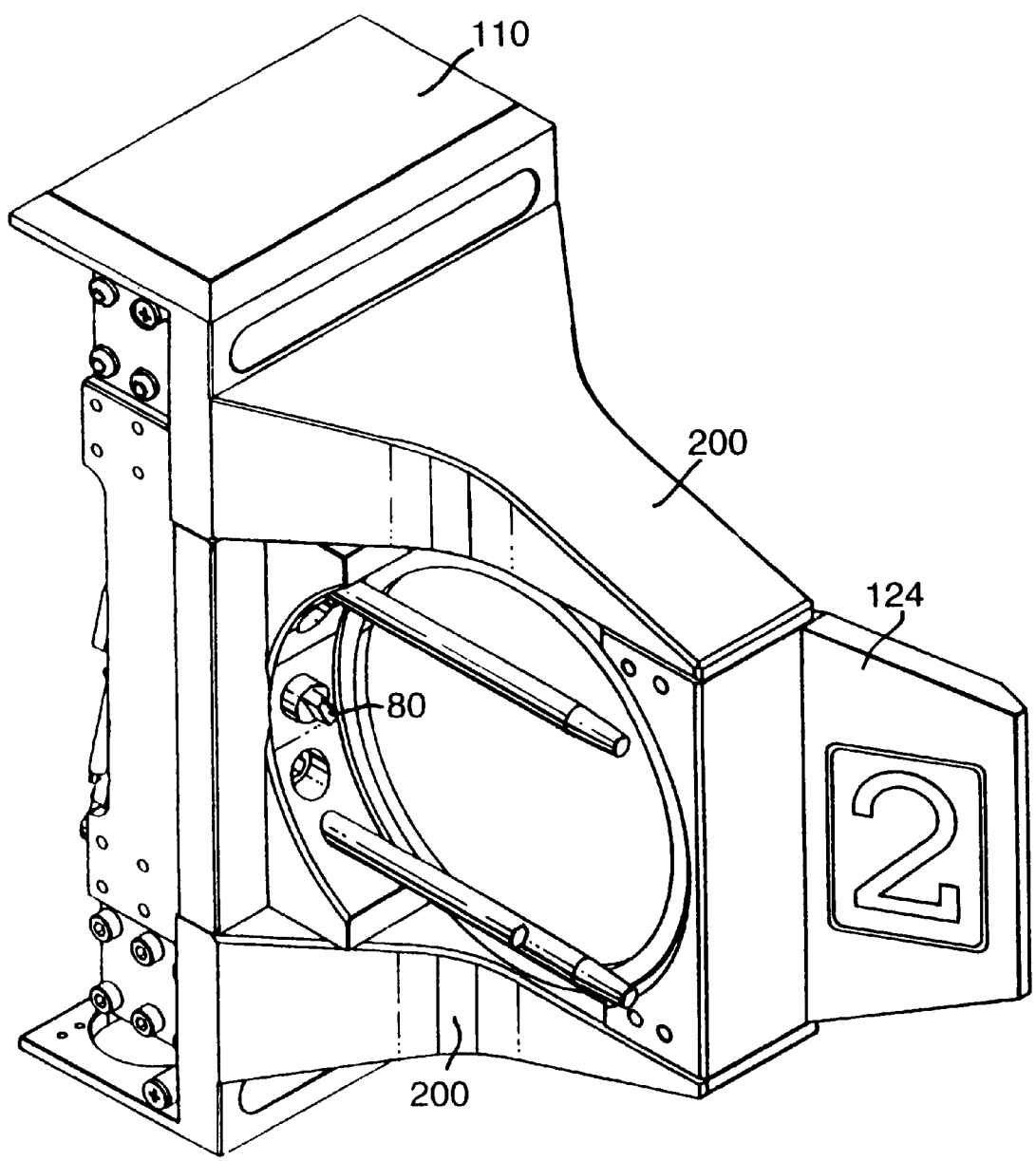
FIG. 5 is a front perspective view of an individual storage port of the magazine of FIG. 1.
Figure 6:
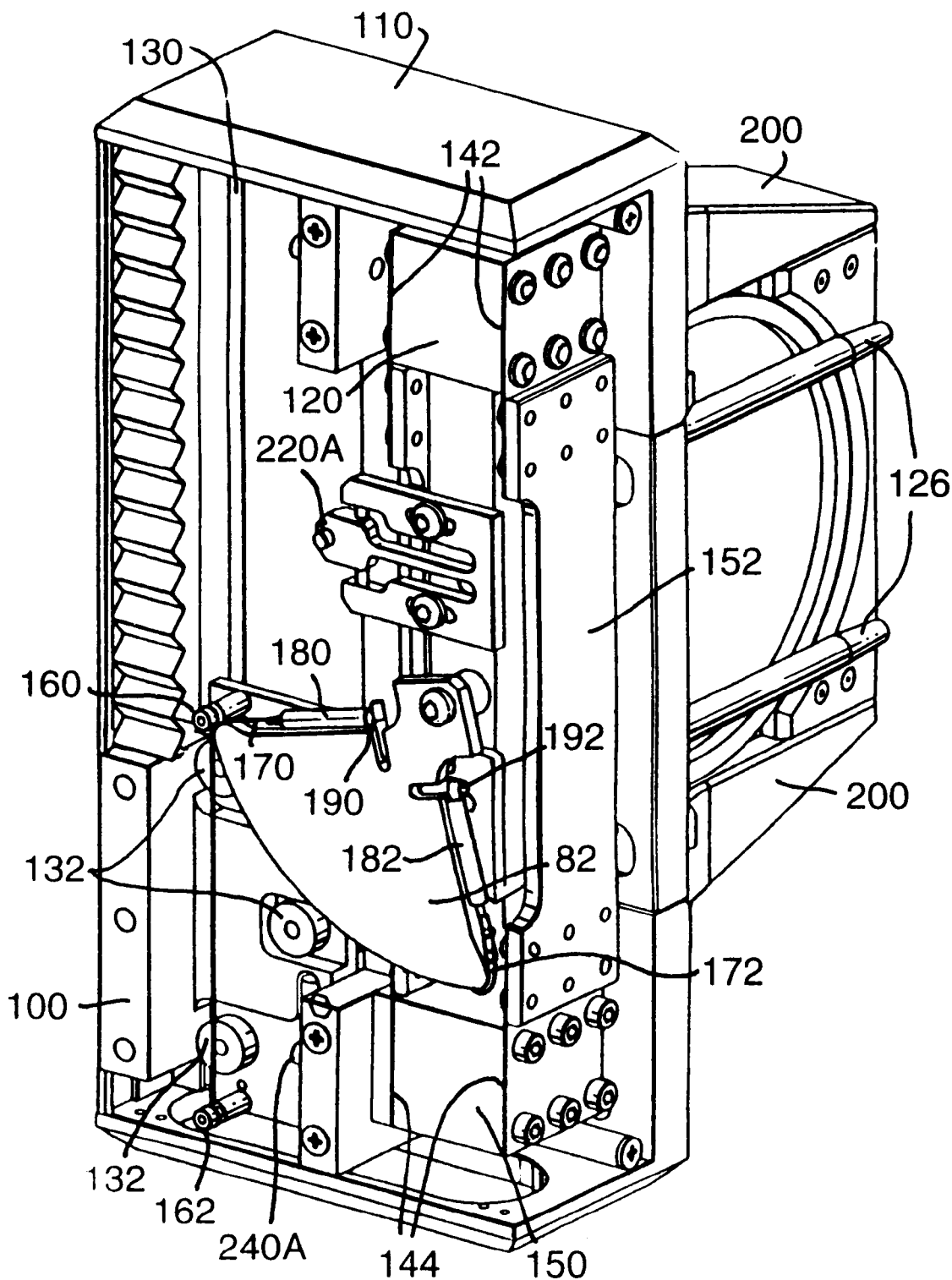
FIG. 6 is a rear perspective view of the storage port of FIG. 5.
Figure 7A:
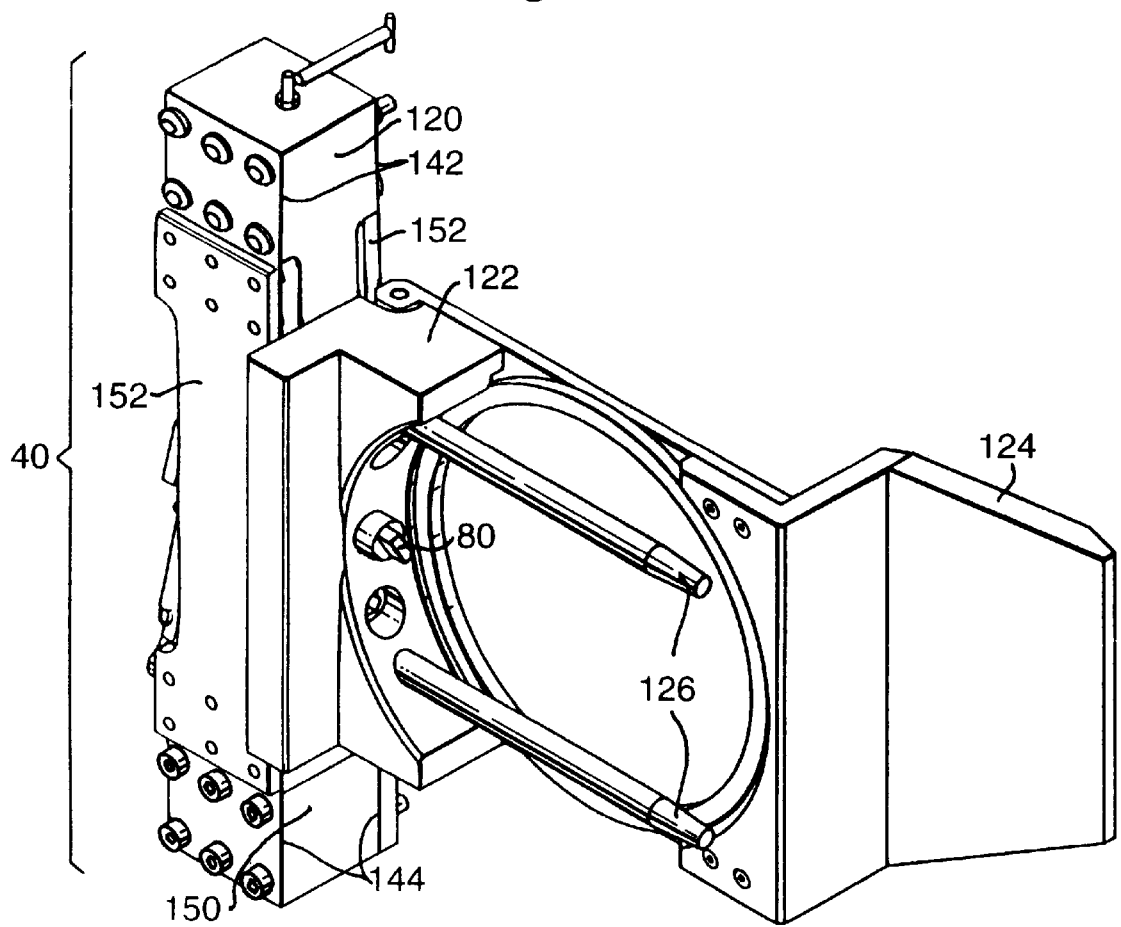
FIGS. 7a and 7b are front and rear perspective views of a sub-assembly of the storage port of FIGS. 5 and 6.
Figure 7B:
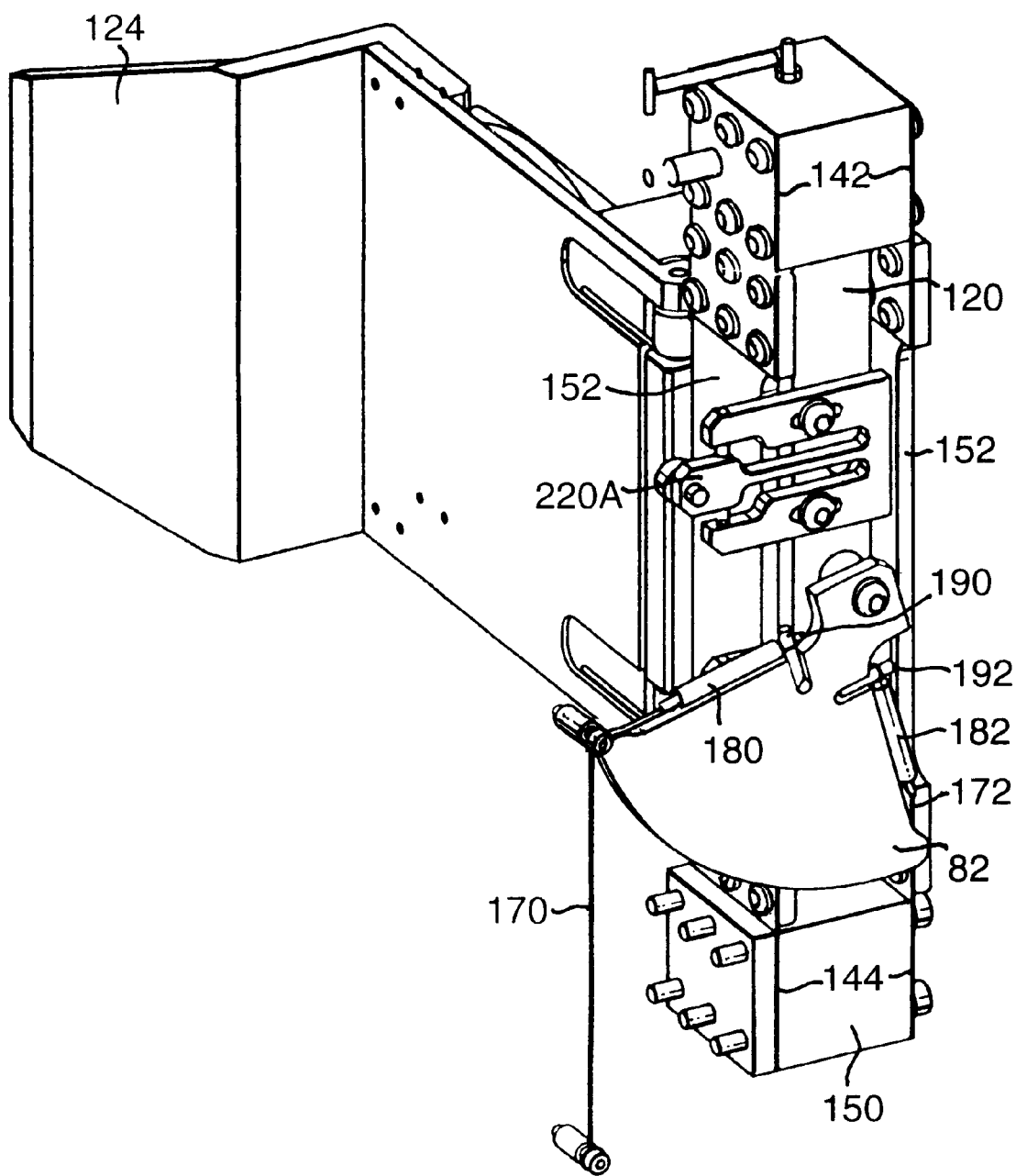

Referring now additionally to FIGS. 5 and 6, the lever 70 includes a slot 72 which, when the operating module 30 is retained in a storage port 20, is engaged by an actuating member in the form of the blade of a screwdriver-type element 80, provided within the storage port 20. The screwdriver element 80 is connected at its rear end to a rotatable crank lever 82. Each storage port 20 is designed so that the crank lever 82 may be rotated to cause locking and unlocking of an operating and retaining module as a result of linear movement of the respective storage port 20 relative to the support plate 14 of the magazine upon which the storage port 20 is mounted. Such linear movement of the storage port 20 is driven by corresponding linear movement of the retaining module 40 (and thus the arm of the machine to which the retaining module is attached), once the retaining module 40 has docked with a storage port for the purpose of performing a locking or unlocking operation.

Referring now to FIGS. 5–8, each storage port includes three relatively movable elements: a carriage 100, a box-shaped housing 110, and a sub-assembly (see specifically FIGS. 7a and 7b) consisting of a base member 120, a U-shaped storage port member 122 fixedly mounted to the base member. A pivotable dust cover 124 prevents contamination of the support elements and locking/unlocking sub-mechanisms on the operating module 30 when it is housed in the magazine. Additionally, the sub-assembly includes a pair of elongate locating pins 126 which hold an operating module 30 in place, and the aforementioned screwdriver member 80. The carriage 100 and box-shaped housing 110 are movable relative to each other linearly, by virtue of the mounting of the carriage 100 upon a pair of parallel runners 130, rigidly connected to the housing 110, which are engaged by three roller members 132 upon the carriage 100. The sub-assembly is mounted to the box-shaped housing 110 via a parallel leaf spring arrangement, which includes a first pair of leaf springs 142 connected to the base member 120 of the sub-assembly, and a second pair of leaf springs 144, connected to a mounting block 150 which is rigid with the box-shaped housing 110, wherein the pairs of leaf springs 142,144 are interconnected by a pair of rigid parallel plates 152. The sub-assembly may, by virtue of leaf spring arrangement 110, move linearly relative to the box-shaped housing in the direction of spacing of the parallel runners 130 upon which the carriage 100 is mounted. In use, the storage port 20 is mounted to the support plate 14 of the magazine via the carriage 100, i.e. the carriage 100 is effectively fixed to the rigid support plate 14 of the magazine.

Figure 9:
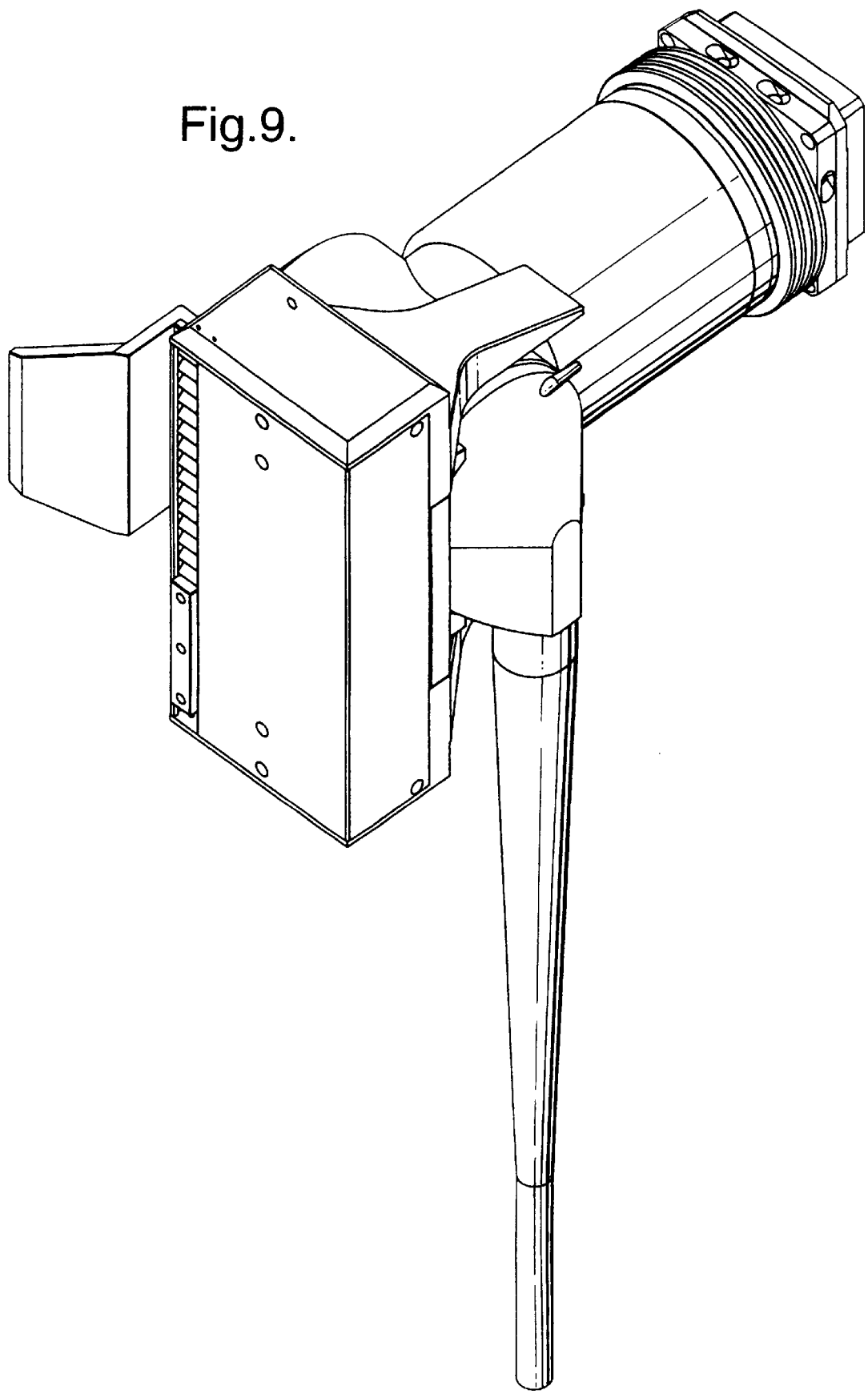
FIG. 9 is a rear perspective view of the exchange operation shown in FIG. 2.

The carriage 110 comprises a pair of support pillars 160,162 to which a pair of cables 170,172 respectively, are anchored. The remote ends of cables 170,172 are connected, via springs 180,182 respectively, to anchorage bolts 190,192 provided on the rotatable crank lever 82. Linear movement of the box-shaped housing 110 and sub-assembly relative to the carriage 100, as permitted by the runners 130 and rollers 132, will, by virtue of the connection of the cables 170,172 between the carriage 100 and the crank lever 82, thus cause rotation of the crank lever 82 (and therefore the screwdriver member 80). This linear movement is actuated by a corresponding linear movement of the retaining module 40 when the module 40 is docked with a storage port 20 during the course of an exchange operation (see for example FIGS. 2 and 9). During such linear movement, the retaining module bears against one of a pair of outwardly projecting, vertically spaced jaws 200, which are rigidly connected to the box-shaped housing 110.

Figure 8:
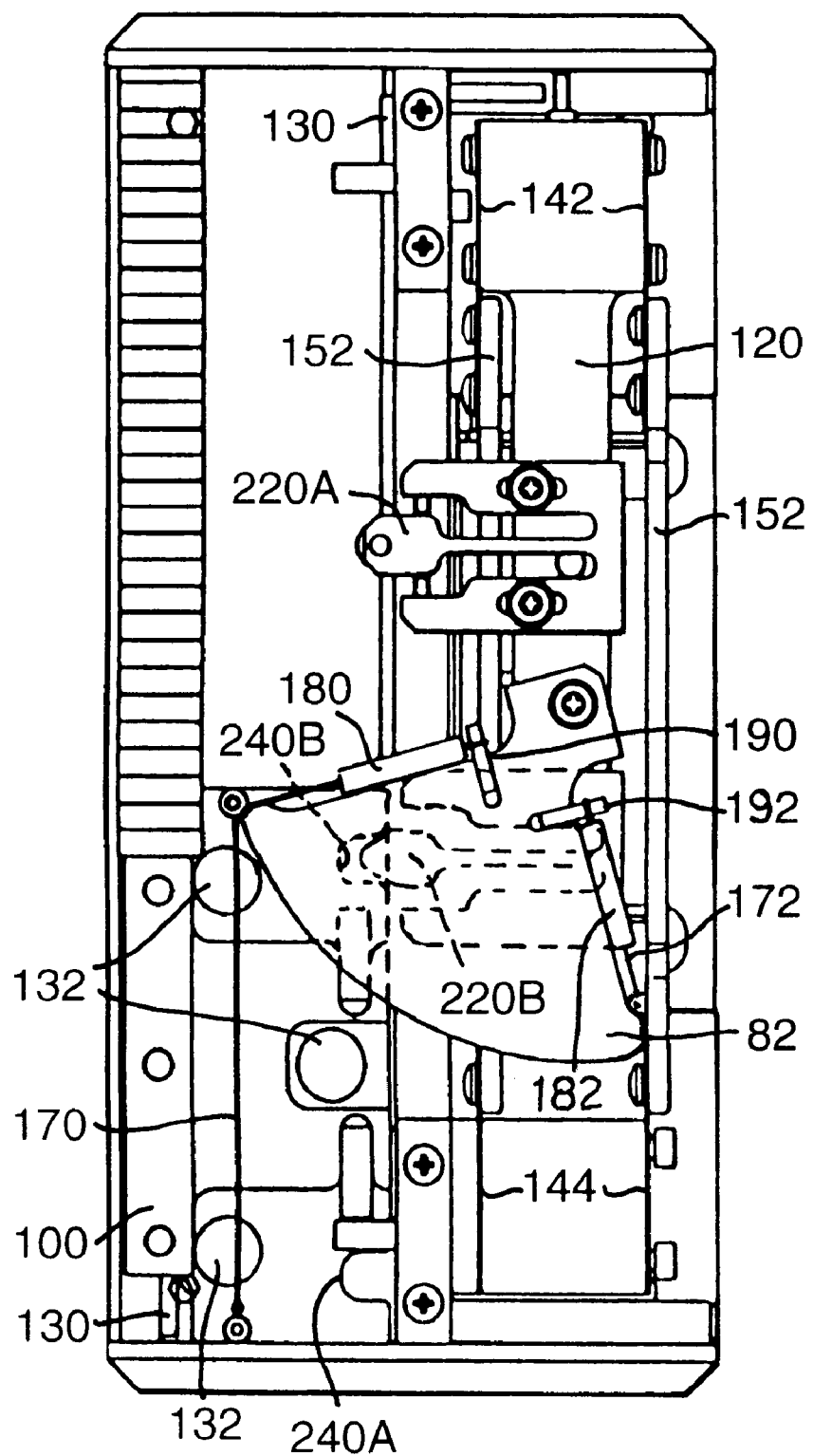
FIG. 8 is a rear elevation corresponding to the perspective view of FIG. 6.

To prevent unwanted relative linear movement, a release mechanism is provided which latches the box-shaped housing and sub-assembly into one of two vertically displaced positions relative to the carriage 100; one of which corresponds to a rotational displacement of the crank lever 82 (and therefore screwdriver member 80) at which the operating module 30 is engaged with the retaining module 40, and the other at which the operating module 30 is disengaged from a retaining module 40. Referring now to FIGS. 6 and 8, a release mechanism which provides this latching includes a pair of vertically spaced locating lugs 220A,B, which are mounted to the rear face of base member 120 of the sub-assembly. In the upper latched position of the storage port (that is to say when the carriage 100 is in its lowest position relative thereto), locating lug 220B seats in a recess 240B in the carriage 100; in the lower latched position of the storage port, locating lug 220A seats in the recess 240A in the carriage 100. Engagement and disengagement of the corresponding locating lugs 220 and recesses 240 is enabled by a small linear movement of the sub-assembly, as permitted by the parallel leaf spring arrangement 140, relative to the box-shaped housing 110. Once the respective lug 220A,B is disengaged from its corresponding recess 240A,B, the box-shaped housing 110 and sub-assembly are free to move together in a vertical direction relative to the carriage 100, thereby to effect locking and unlocking of a operating module 30 and retaining module 40.

Referring now to FIG. 3, the movement of the retaining module 40 during the course of a coupling operation is shown. Initially, the retaining module will approach the storage port in a direction parallel to the D axis of the probe head which provides the retaining module, i.e. along a path AB in FIG. 3. During movement of the retaining module along this path, the engagement of the retaining module with the dust cover 124 causes the dust cover 124 to pivot out of the way, revealing the mating face of the operating module 30. The retaining module 40 is subsequently driven along a horizontal path, shown in FIG. 3 as BC. During movement of the retaining module 40 along this path, the retaining module 40 comes into contact with the operating module 30; continued movement of the retaining module 40 along the path after such contact causes actuation of the release mechanism by disengaging the lug 220B from its corresponding slot 240B. As a result of this, the retaining module may then move vertically upward along the path CD in FIG. 3. Since the retaining module 40 is now docked within the storage port, and is in contact with the jaws 200, the box-shaped housing and sub-assembly will also move relative to the carriage 100 and support plate 14 of the magazine along the path CD, as a result of which the crank lever 82 and screwdriver 80 will rotate, causing a corresponding rotation of the cam 62 on the operating module 30 and thereby locking of the operating module 30 and retaining module 40. The retaining module is then moved along the path DE, allowing engagement of the lug 220A and slot 240A, thus latching the storage port into its new vertical displacement. As the retaining module backs out of the storage port along EF, the pivotable dirt cover 124 closes.

The locating lugs are mounted to the base member 120 of the sub-assembly via relatively flexible rods 250. This provides a small degree of compliance between the carriage 100, and the box-shaped housing 110 and sub-assembly when the lugs 220A,B are engaged in the slots 240A,B. Such compliance allows for a small tolerance in the path of the retaining module 40 (and thus the arm of the machine) during an exchange operation.

Figure 10:
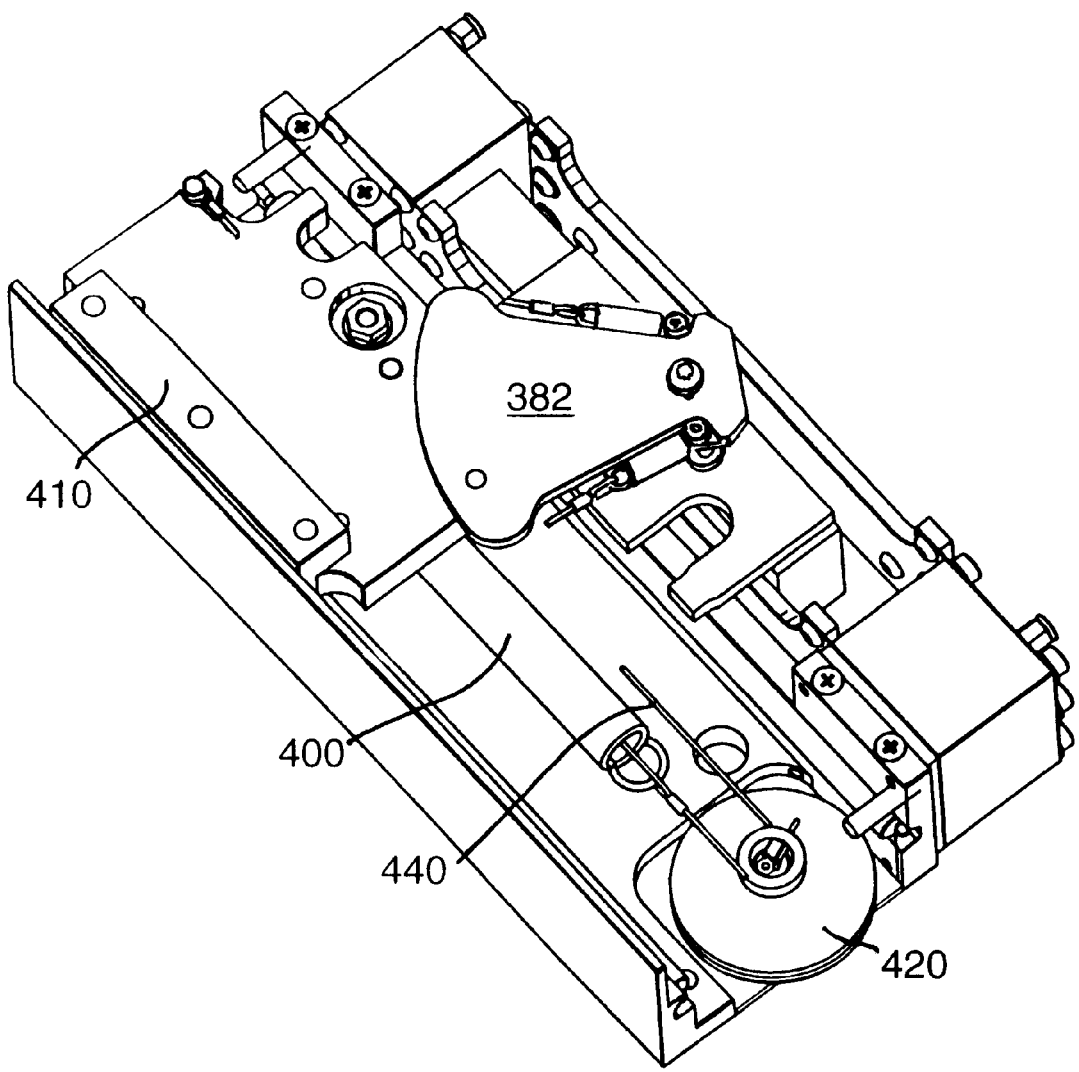
FIG. 10 is a rear perspective view (equivalent to that of FIG. 6) of a modification to the storage port of FIGS. 1 to 9.

A modified form of storage port is shown in FIG. 10, and includes a modified profile of crank lever 382, to provide a more expedient application of torque to the screwdriver 80 for the purpose of rotating the cam 62 to lock modules together. This modification also provides a bias on the storage port to compensate for the effect of gravity: helical spring 400 is mounted to the storage port at a location concealed in FIG. 10 by the carriage 410, and applies a translational biasing force to the carriage 410 via a fusee 420 and bias cable 440 (provided to create substantially constant biasing force with displacement of the carriage 410).

The illustrated embodiments of the present invention all possess mechanical locking mechanisms which pull the support elements into mutual engagement. Alternative mechanisms are possible. For example a solenoid on the operating module may be energised to provide locking of the operating and retaining modules by the switching of electrical power to a pair of electrical terminals on the retaining module; the switching being actuated by movement of the storage port and/or retaining module relative to the support structure of the magazine. Alternatively permanently magnetised structures on the operating and retaining modules may be oriented to attract or repel each other (thereby locking and unlocking support elements into engagement) by means of such relative movement.

I claim:

1. A system providing exchange of operating modules on a coordinate positioning machine including a magazine and a retaining module, which are located on different and relatively movable parts of the machine;

the magazine having a plurality of storage ports with which the retaining module may dock to perform an exchange operation, at least one of the storage ports housing an operating module; both the operating and retaining modules having support elements which are mutually engageable to locate the operating module repeatably on the retaining module;

the system also having a releasable locking mechanism including co-operable sub-mechanisms on the operating and retaining modules which act to hold the support elements in mutual engagement, locking and unlocking of the locking mechanism being performed by an actuating movement of at least a part of one of the sub-mechanisms between two positions;

wherein during an exchange operation, the actuating movement to lock/unlock the locking mechanism is actuatable by movement that occurs while the storage port and the retaining module move relative to a part of the machine on which the magazine is located, while the retaining module is docked with the storage port to perform an exchange operation.

2. A system according to claim 1 having an actuating member situated on the retaining module or the storage port, movement of the actuating member being powered by the movement that occurs while the retaining module and the storage port move relative to the part of the machine on which the magazine is mounted, and wherein during the relative movement, the actuating member is engageable with said one of the sub-mechanisms to cause the actuating movement between the two positions.

3. A system according to claim 2, wherein at least a part of the one sub-mechanism is movable between the two positions to actuate a mechanical interaction of the sub-mechanisms, and thereby to lock the support elements into mutual engagement.

4. A method of operating a coordinate positioning machine having a retaining module and a magazine supported on different and relatively movable parts of the machine, the magazine having a plurality of storage ports housing an operating module and a base upon which the storage ports are movably mounted, the method comprising the steps of:

operating the machine to dock the retaining module with a storage port;

operating the machine to move the storage port and retaining module simultaneously relative to the base of the magazine;

using a movement that occurs while the storage port and the retaining module move relative to the base of the magazine to actuate a mechanism which locks the operating module and retaining module together; and with the operating and retaining modules locked together, operating the machine to undock the retaining module from the storage port.

5. A system according to claim 2, wherein the magazine has a base structure mounted on the machine, and the storage port is movably mounted to the base structure.

6. A system according to claim 5, wherein the storage port is linearly movable relative to the base structure.

7. A system according to claim 5, further including a release mechanism which operates to permit and prevent the relative movement which powers the actuating member to lock and/or unlock the operating and retaining modules.

8. A system according to claim 7, wherein the release mechanism is actuatable by a further and distinct release movement of at least a part of the storage port relative to the base structure.

9. A system according to claim 8, wherein the relative movement which powers the actuating member takes place along a first direction, and the release movement which actuates the release mechanism takes place along a second direction transverse to the first direction.

10. A magazine having a base structure and a plurality of storage ports, at least one of which houses an operating module, the at least one storage port being mounted to the base structure in a manner enabling relative movement of the storage port and the base structure, an actuating member situated on each storage port which is movable between first and second positions thereby to cause motion of a locking mechanism in the operating module, wherein the relative movement between the storage port and the base structure causes a movement of the actuating member between the first and second positions, thereby to actuate the locking mechanism in the operating module.

11. A magazine according to claim 10, wherein the storage ports are linearly movable relative to the base structure.

12. A magazine according to claim 11, wherein the locking movement of the actuating member is rotation between the first and second positions.

13. A magazine according to claim 10, further comprising a release mechanism which operates to permit and prevent the relative movement of the storage port and base structure which moves the actuating member.

14. A magazine according to claim 13, wherein the release mechanism is actuatable to permit the relative movement of the port and base structure which moves the actuating member by a further and distinct release movement of at least a part of the storage port relative to the base structure.

15. A magazine according to claim 14, wherein the relative movement of the storage port and base structure which moves the actuating member is a linear movement along a first direction, and the release movement is a movement along a second direction, transverse to the first direction.

16. A method according to claim 4, wherein the simultaneous movement of the retaining module and storage port includes: a simultaneous release movement in a first direction, which then enables a subsequent simultaneous actuating movement in a second direction, which is in turn followed by a simultaneous movement in a direction opposite to the first direction to prevent further unwanted actuating movement.

17. A method according to claim 4, wherein the operating and retaining modules are mechanically locked together.

18. A method according to claim 4, wherein relative movement of the storage port and the part of the machine upon which the magazine is located actuates the locking of the operating and retaining modules.

* * * * *